INVENTOR
L. D. KLEISS
BY Young & Quigg
ATTORNEYS

3,491,582
POUR POINT ANALYZER
Louis D. Kleiss, Borger, Tex., assignor to Phillips Petroleum Company, a corporation of Delaware
Filed Sept. 12, 1966, Ser. No. 578,564
Int. Cl. G01n 25/02
U.S. Cl. 73—17                                                  2 Claims

ABSTRACT OF THE DISCLOSURE

In an automatic, continuous, repetitive, pour point analyzer for a liquid, in which samples of the liquid are serially and repetitively frozen in a freezing zone by a slug of expanding gas from an exhaustible source, and then melted by ambient heat, the improvement comprising making the slugs of expanding gas uniform as to the rate of cooling of the samples as the exhaustible source is exhausted by heating the exhaustible source. If the expanding gas is supplied as a gas in FIGURE 1, the exhaustible source is heated just enough to maintain a constant pressure. If the expanding gas is supplied as a liquid in FIGURE 2, the exhaustible source is heated just enough to maintain a constant difference in temperature of the liquefied expanding gas in the exhaustible source above its temperature in the freezing zone.

---

Figure 2:
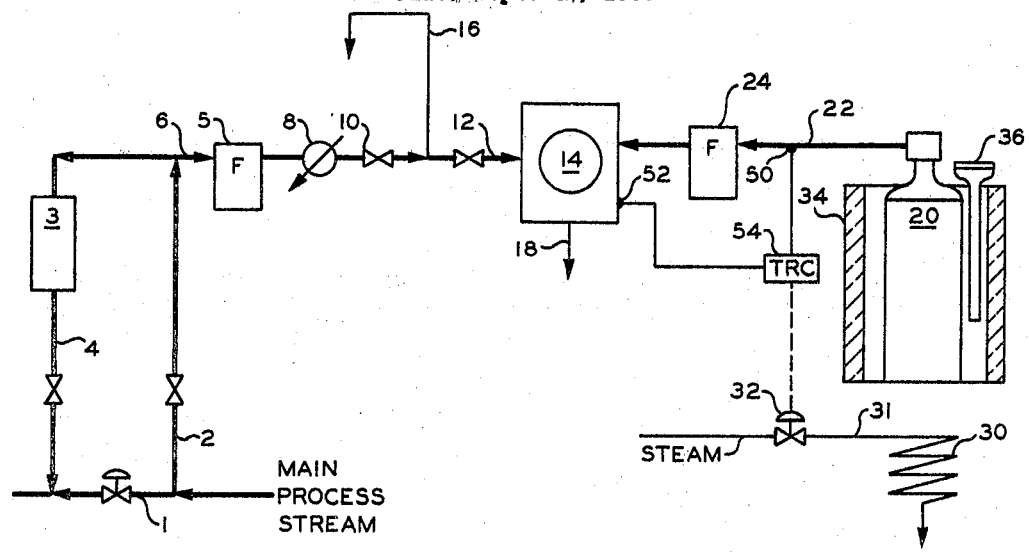

This invention relates to a pour point analyzer. In one of its aspects it relates to an analyzer for determining the pour point of distillate fuels and the like wherein successive samples of a fuel are cooled to freezing by an expanding and/or vaporizing gas and the melting point of each frozen sample is measured to determine the pour point, and wherein the rate of cooling of each sample is maintained constant.

A pour point of a hydrocarbon mixture is defined as the lowest temperature at which an oil will just pour, or flow, under its own weight under specified conditions. The pour point test it most generally carried out in the laboratory according to ASTM "Standard Method of Test for Cloud and Pour Points," D97–57, by placing a small quantity of oil into a standard bottle which is then placed in a succession of freezing mixtures. A thermometer is fixed in the oil, and as the temperature falls, the bottle is removed from the cooling bath at every 5° F. fall in temperature and tilted to determine whether the oil will flow. The lowest temperature at which the oil still remains liquid, or flowable, is known as the pour point. This test is quite time consuming, requires the constant attention of an operator and is subject to errors by the operator. The production of many petroleum products, particularly fuel oils such as are used for domestic purposes, is frequently limited by pour point specifications. In such a case, a rapid means of measuring the pour point enables the specification limit to be more nearly approached and will aid in maximizing the efficiency of the production operation.

When oils, for example light cycle oils, do not have sufficient fluidity to meet specifications of pour point temperatures, additives such as naphtha must be blended with the oils to give the desired pour point. Compositions of cycle oils, for example, change rapidly in the refinery. Thus, it is desirable to have an instantaneous measurement of pour point. With a laboratory technique as described in the above ASTM specifications require about half an hour to an hour to complete. Thus, during the time in which the pour point is being analyzed many gallons of fuel may be produced which have above or below specification pour points.

A number of instruments have been developed to give instantaneous pour point analysis. One such analyzer is produced by Beckman Instruments, Inc., Fullerton, California. In this instrument, a sample is frozen by the evaporation and expansion of a liquefied and compressed gas stream, and upon reheating, the melting point of the sample is measured. Any differences between the melting point and the pour point can be calibrated to give a relatively accurate determination of pour point.

I have found that in this type of analyzer the reproducibility of results is at least in part dependent on the rate of cooling of the sample. As the ambient temperature changes and/or the expansion ratio of gas changes due to depletion of gas source, the ratio of cooling due to the gas expansion will vary. This variation can be substantially eliminated by maintaining the pressure of the supply gas at a predetermined pressure or by maintaining the temperature of a liquefied gas source at a temperature relative to the room temperature.

By various aspects of this invention, one or more of the following, or other, objects can be obtained.

It is an object of this invention to provide a pour point analyzer in which liquid sample is solidified by an evaporating and/or expanding gas stream whereby the rate of cooling is maintained constant for each sample so analyzed.

It is a further object of this invention to eliminate the fluctuation in the rate of cooling from a gas expansion in a pour point analyzer, due to the depletion of the gas source.

It is still a further object of this invention to eliminate the fluctuation in the rate of cooling of a gas expansion in a pour point analyzer, the fluctuation in the rate of cooling from sample to sample due to changes in the ambient temperature in which the gas source is located.

Other aspects, objects, and the several advantages of this invention are apparent to one skilled in the art from a study of this disclosure, the drawings, and the appended claims.

A pour point analyzer is an instrument in which a continuously flowing sample is frozen as it trickles down the walls of a vertical tube. A lower zone of this vertical tube is cooled by the evaporation and/or expansion of a liquefied and/or compressed gas, and the sample freezes in this zone. As the freezing progresses, the downward flow of sample is blocked by a solid plug of frozen sample. The continuously flowing sample rises to the top of the vertical tube. This rise is sensed, for instance, by light reflected from the liquid surface to a photocell. Cooling is stopped, and the vertical tube starts to warm up from ambient or applied heat. When the frozen plug is partially melted, it and the liquid above it abruptly fall out the bottom of the tube. This fall is sensed, for instance, by the non-reflection of light to the above photocell. The wall temperature of the freezing and thawing zone is recorded at the instant of fall, and it is this instantaneous temperature which correlates with the pour point of the oil.

The composition and the crystal structure of the frozen oil plug determines the temperature at which it melts. A typical oil is a mixture of several hydrocarbons, some of which freeze at a higher temperature than the others. As this oil is cooled in the freezing zone, those hydrocarbons having the higher freezing point tend to solidify first and cling to the wall of the vertical tube in the freezing zone, while those hydrocarbons with the lower freezing point tend to remain fluid and flow down the tube. With this type of analyzer, the frozen plug unavoidably contains a larger proportion of the high freezing point hydrocarbons than does the sample oil, and this proportion varies with the rate of cooling. The frozen oil plug structure may range from crystalline to amorphous. This crystal structure is influenced by the speed with which the oil is frozen. It has been observed that, for a typical furnace oil, the analyzer record will vary as much as 14° F. for various rates of cooling.

According to the invention, the rate of cooling of the sample is maintained constant for each sample so analyzed. The rate of cooling is maintained constant by either supplying the gas which is to be expanded at a constant pressure or, in the case of a liquefied stream, by maintaining a predetermined temperature relationship between the ambient temperature (i.e. the temperature of the freezing chamber) and the temperature of the gas stream. In one embodiment, the compressed gas is supplied in an exhaustible source such as a tank and the pressure in the supply line is maintained constant by heating the tank responsive to the sensed pressure in the supply line. In another embodiment, the tank is heated responsive to a differential temperature measurement between freezing chamber temperature and the temperature of liquefied gas in the supply line.

Figure 1:
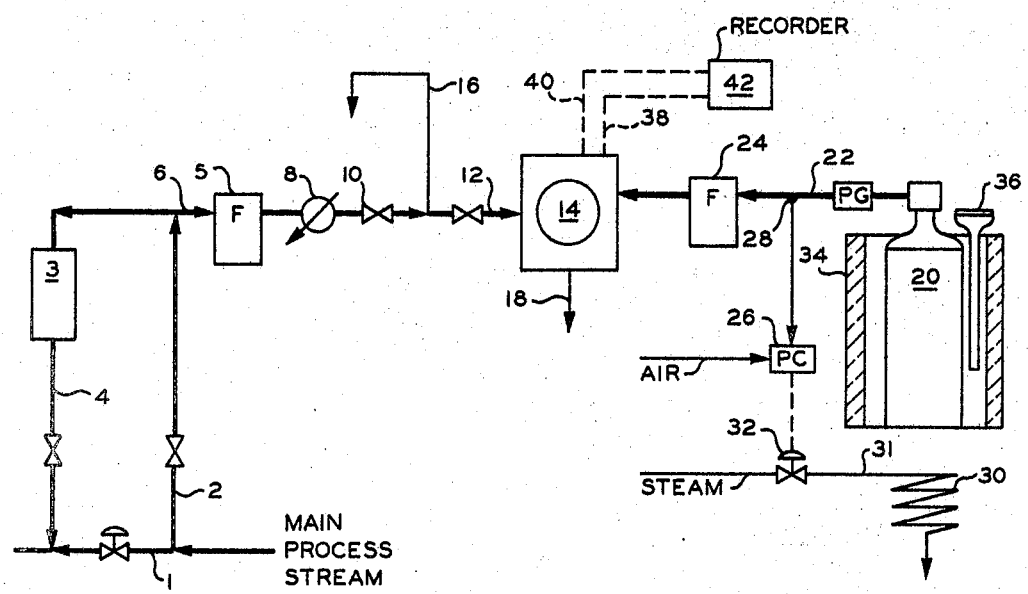

The invention will now be described with reference to the accompanying drawings in which FIGURE 1 shows a schematic representation of a first embodiment of the invention; and FIGURE 2 is a schematic representation of a second embodiment of the invention.

Referring now to FIGURE 1 in particular, a process stream 1 supplies a fuel composition from a refinery or other such process stream. A small portion of stream 1 is removed through line 2, a portion of the sample in line 2 is passed through flow meter 3, and returned to line 1 via line 4. A portion of the sample passes through line 6, filter 5, water cooler 8 if desired, through valve 10, line 12, and into analyzer 14. The sample in analyzer 14 passes into a vertical conduit (not shown), the lower portion of which can be selectively cooled by expansion of gas or liquid from cylinder 20, passing through line 22 and filter 24. During the cooling cycle of analyzer 14, a plug of frozen oil is formed in the lower portion of the vertical conduit, causing the incoming sample to overflow said vertical conduit. This rise in oil level is sensed by a photocell, and cooling is stopped. The vertical conduit is warmed by ambient heat. The frozen oil plug melts and falls out the bottom of the vertical conduit, dropping the oil level. The wall temperature required to melt the frozen plug is recorded at the time the oil level falls. The cooling and thawing cycles repeat automatically. The operation of analyzer 14 is more fully described in Beckman Instruction Manual 3117-B, Industrial Pour Point Analyzer, dated August 1964.

According to the invention, the rate of cooling for each sample which is supplied to analyzer 14 is maintained constant. According to the embodiment shown in FIGURE 1, a pressure sensor 28 in line 22 senses the pressure in the gas supply line. A signal representative of the pressure in line 22 is sent to pressure controller 26 and according to a predetermined pressure, a signal is sent to valve 32 which controls the flow of steam through line 31 to coil 30 which heats cylinder 20. Cylinder 20 is surrounded by an insulating sheath of material 34 and provided with a visual dial thermometer 36. A steam trap can be provided in the bottom of coil 30 for removal of water from the steam coils.

Referring now to FIGURE 2, where like figures are used to designate like parts and there is shown a system in which the cooling fluid is supplied in liquid form to the freezing chamber of analyzer 14, a temperature control means is shown which control means makes sure that each sample is cooled at a uniform rate. Temperature sensing devices 50 and 52 sense the temperature in the head of supply line 22 and in analyzer case 14, respectively. The temperature sensor 50 should be as close to the source as possible. According to a predetermined temperature differential, a signal is sent to valve 32 which accordingly adjusts the flow of steam through line 31 to coil 30 to heat the liquefied gas in cylinder 20. Preferably, the temperature in the supply line 22 is maintained at a predetermined value above ambient temperature. However, when the temperature of the source rises above the critical point of the compound, for example 88° F. for $CO_2$, then this system is less effective than the system of the first embodiment due to the fact that the cooling fluid will be gaseous. The temperature of the source or supply line can be maintained the same as, above, or below the temperature of the analyzer case 14. However, the relationship between the two temperatures should be constant once the system is devised or the results will not be reproducible. For example, if it is decided to maintain the liquid supply temperature at 5° F. below the analyzer case 14 temperature, then that 5° temperature difference must be maintained.

The preferable gas for use in the invention is carbon dioxide although other gases such as oxygen, nitrogen, argon, helium and even hydrogen in some cases can be used. The gas is compressed and supplied in fixed volumes to analyzer head 14.

SPECIFIC EXAMPLE

A hydrocarbon distillate fuel is continuously sampled by a pour point analyzer as above described. The distillate fuel is fed to analyzer head 14 and therein contacted with a pulsed predetermined volume of $CO_2$ to freeze the sample. The sample melting point is sensed by a thermocouple and recorded on a chart recorder against time. The sample melting point is then used to determine whether more or less lower pour point additive need be combined with the fuel distillate. The $CO_2$ cylinder is located outside the building in which the analyzer is located. Due to changes in the outside temperature, the temperature of the source will change. In a liquefied gas system, the pressure of the liquefied gas is dependent on the temperature of the liquid. Throughout the hours of the day, the temperature of the source changes with the otuside temperature and thus the pressure of the cooling fluid changes. The changes in the pressure of the fluid changed the cooling rate of the sample and thereby caused variations in the pour points on the same sample.

In one analyzer, a pressure responsive heating device such as described above with reference to FIGURE 1 was placed in operation. It was found that the fluctuation of the pour point due to gas pressure changes was eliminated.

In a second analyzer, where an evaporating and expanding liquid $CO_2$ is used to cool a sample, a temperature sensitive heating device such as described with reference to FIGURE 2 is used. The device eliminates fluctuation of pour point due to temperature changes of the source as long as the temperature of the source remains below 88° F., the critical point of $CO_2$.

Reasonable variation and modification are possible within the scope of the foregoing disclosure, the drawings, and claims to the invention without departing from the spirit thereof.

I claim:
1. A process for the automatic, continuous, repetitive, pour point analysis of a liquid, in which samples of the liquid are serially and repetitively frozen in a freezing zone by a slug of expanding gas from an exhaustible source, and then melted by ambient heat, the improvement comprising making the slugs of expanding gas uniform as the rate of cooling of the samples as the exhaustible source to exhausted by measuring the pressure of said gas as it passes between the exhaustible source and the freezing zone, comparing this pressure to a predetermined value, and heating the exhaustible source when this pressure is below the predetermined value to maintain a substantially constant pressure as the source is exhausted.

2. A process for the automatic, continuous, repetitive, pour point analysis of a liquid, in which samples of the liquid are serially and repetitively frozen in a freezing zone by a slug of an evaporating liquid from an exhaustible source, and then melted by ambient heat, the improvement comprising making the slugs of evaporating liquid uniform as to the rate of cooling of the samples as the exhaustible source is exhausted by measuring the temperature of said liquid as it passes between the exhaustible source and the freezing zone, comparing this measurement to the temperature of the freezing zone and heating the exhaustible source when this temperature of the passing liquid is less than a predetermined amount above said temperature of the freezing zone.

References Cited

UNITED STATES PATENTS

| 2,884,766 | 5/1959 | Cropper | 62—130 |
| 3,173,288 | 3/1965 | Davis et al. | 73—17 |
| 3,173,289 | 3/1965 | Davis | 73—17 |

JAMES J. GILL, Primary Examiner

H. GOLDSTEIN, Assistant Examiner